United States Patent
Prust (10) Patent No.: US 6,714,968 B1
(45) Date of Patent: Mar. 30, 2004

(54) METHOD AND SYSTEM FOR SEAMLESS ACCESS TO A REMOTE STORAGE SERVER UTILIZING MULTIPLE ACCESS INTERFACES EXECUTING ON THE REMOTE SERVER

(75) Inventor: Mitch Prust, 16244 Ramsey Blvd. NW., Ramsey, MN (US) 55303

(73) Assignee: Mitch Prust, St. Paul, MN (US)

(*) Notice: Subject to any disclaimer, the term of this patent is extended or adjusted under 35 U.S.C. 154(b) by 0 days.

(21) Appl. No.: 09/501,041

(22) Filed: Feb. 9, 2000

(51) Int. Cl.⁷ .................. G06F 15/16; G06F 15/173; G06F 9/00
(52) U.S. Cl. .................. 709/219; 709/217; 709/203; 709/225; 709/328
(58) Field of Search .................. 709/217–219, 709/328, 214, 203

(56) References Cited

U.S. PATENT DOCUMENTS

| | | | |
|---|---|---|---|
| 5,748,896 A | * 5/1998 | Daly et al. | 709/223 |
| 6,216,168 B1 | * 4/2001 | Dev et al. | 709/245 |
| 6,289,382 B1 | 9/2001 | Bowman-Amuah | |
| 6,311,213 B2 | * 10/2001 | Dawson et al. | 709/217 |
| 6,356,863 B1 | 3/2002 | Sayle | |
| 6,356,941 B1 | * 3/2002 | Cohen | 709/219 |
| 6,366,987 B1 | * 4/2002 | Tzelnic et al. | 711/162 |
| 6,393,466 B1 | 5/2002 | Hickman et al. | |
| 6,449,688 B1 | * 9/2002 | Peters et al. | 709/233 |
| 6,453,325 B1 | * 9/2002 | Cabrera et al. | 707/204 |
| 6,466,978 B1 | * 10/2002 | Mukherjee et al. | 709/225 |

FOREIGN PATENT DOCUMENTS

WO WO 94/18634 8/1994
WO WO 98/24025 6/1998

OTHER PUBLICATIONS

XP-000888651, Client Application for Integrating a Development Environment with a Web Distributed Authoring (WebDAV) Server, Research Disclosure, Disclosed by International Business Machines Corporation, 2 pages (Apr. 1999).

International Search Report from Application No. PCT/US 01/04352 mailed Oct. 9, 2003 (4 pages).

Goals for a configuration management network protocol, Whitehead, E.J., System Configuration Management, 9ᵗʰ International Symposium. SCM–9, Proceedings,Toulouse, France Sep. 5–7, 1999, ISBN: 3–540–66484–X, 18 pages.

WebDAV: A Panacea for Collaborative Authoring?, Sussman, D., Siemens Corporate Research, Apr.–Jun. 1999, pp. 76–79.

(List continued on next page.)

Primary Examiner—David Wiley
Assistant Examiner—Joseph E. Avellino
(74) Attorney, Agent, or Firm—Shumaker & Sieffert, P.A.

(57) ABSTRACT

A data storage system is described that provides seamless access to remote data storage areas via a global computer network. The data storage system includes one or more storage servers coupled to one or more storage devices. The storage devices provide a plurality of virtual storage areas, where each virtual storage area is assigned to a user. Access to the virtual storage areas is fully integrated with an operating system executing on a client computer such that the user, or software applications executing on the client computer, can seamlessly access the corresponding virtual storage area using standard file management routines provided by the operating system. In addition, the invention provides a wide range of other remote access methods to the virtual data storage areas.

25 Claims, 8 Drawing Sheets

OTHER PUBLICATIONS

World Wide Web Distributed Authoring and Versioning: Web DAV, Whitehead, E.J., WebDAV Information, Feb. 1999, pp. 1–2.

Requirements for Distributed Authoring and Versioning on the World Wide Web, Slein, J.A.; Vitali, F.; Whitehead, Jr., E.J.; Durand, D.G.; Standard View VI. 5, No. 1, Mar. 1997, ISSN: 1067–9936, pp. 17–24.

How to implement Web–based groupware systems based on WebDAV, Dridi, F.; Neumann, G., Enabling Technologies: Infrastructure for Collaborative Enterprises, Jun. 1999, Proceedings IEEE $8^{th}$, ISBN: 0–7695–0365–9, pp. 114–119.

U.S. patent application entitled, "Remote Storage Area Having Multiple Access Interfaces," Ser. No. 09/500,868, filed Feb. 9, 2000.

http://www.webdav.org—WebDAV Resources.
http://www.backup.com—@Backup®.
http://www.bitlocker.com—Bitlocker.
http://www.datahubonline.com—datahubonline.com.
http://www.diskonnet.com—DiskOnNet.com.
http://www.docspace.com—Critical Path Inc.
http://www.driveway.com—Driveway Corporation.
http://itools.mac.com—Apple—iTools.
http://www.filemonkey.com—File Monkey Software Development Services.
http://www.freedrive.com—FreeDrive, Inc.
http://www.xinet.com—Xinet, Inc.

\* cited by examiner

AppleScript Example:

On adding contents to folder this folder
Set folder_content to the contents of
    this folder
Set the selected_SiLO_directory to the
    comments of this folder
Tell application "SiLO access layer"
Activate
Upload folder_content to the
    selected_SiLO_directory
End tell

METHOD AND SYSTEM FOR SEAMLESS ACCESS TO A REMOTE STORAGE SERVER UTILIZING MULTIPLE ACCESS INTERFACES EXECUTING ON THE REMOTE SERVER

TECHNICAL FIELD

This invention relates to storage of digital data, and more particularly to a data storage system that provides access to a remote storage area.

BACKGROUND

The Internet is a worldwide collection of networks that spans over 100 countries and connects millions of computers. Reports indicate that the Internet is growing faster than all preceding information technologies including radio and television. Remote data storage over the Internet is one of the fastest growing facets of the Internet. Numerous companies provide a wide range of an Internet data storage services for remotely storing and managing data files. Many of these services, however, have limited modes for accessing the data files. For example, many require that a user load proprietary software on his computer in order to communicate data files to the remote storage. Other services only support access via a web browser or similar communication utility.

SUMMARY

The present invention is directed to a data storage system and method capable of providing a variety of access methods. In particular, the a system and method in accordance with the present invention can be configured to easily and seamlessly interact with a user's computer without requiring proprietary software.

As explained in detail below, the system and method can be configured to provide seamless access to a plurality of remote storage areas. Authorized users can access data files from anywhere in the world via a global computer network such as the Internet or a private wide-area network. In one embodiment, access to the virtual storage area is fully integrated with an operating system executing on a client's computer for seamless access using standard file management routines provided by the operating system. In addition, utilities, such as the Macintosh® Sherlock® search tool, can seamlessly search the remote storage areas.

In one embodiment, the data storage system includes a plurality of storage servers coupled to a plurality of storage devices. The storage devices provide a plurality of virtual storage areas, each storage area assigned to a user. According to the invention, the assigned user can seamlessly access the assigned virtual storage area using a client computer communicatively coupled to the storage servers via a global computer network such as the Internet. An operating system executing on the computer includes a set of application programming interface (API) routines for managing local data files. The operating system provides access to the storage areas over the global computer network using the file management API routines provided by the operating system. In order to store data files, the operating system encrypts the data files and communicates the data files to the storage server for storage within the storage area. When the user or a software application requests access to a data file, the operating system issues requests to the storage server to retrieve one or more data files from the storage area.

The details of one or more embodiments of the invention are set forth in the accompanying drawings and the description below. Other features, objects, and advantages of the invention will be apparent from the description and drawings, and from the claims.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the claims.

The detailed description is divided into three sections. The first section provides definitions for various terms used throughout the detailed description. The second section describes an exemplary hardware and operating environment in conjunction with which embodiments of the invention can be practiced. Finally, the third section describes various systems, methods, potential benefits and alternative embodiments of the invention.

Definitions

File Transport Protocol (FTP)—A networking protocol specifically for transporting files from one computer on the network to another.

HyperText Markup Language (HTML)—an authoring language that defines the syntax and semantics used to create documents on the World Wide Web.

Internet—a worldwide collection of networks that spans hundreds of countries and connects millions of computers.

Internet Protocol (IP)—A low level communications protocol that specifies the format of individual communication packets and an addressing scheme.

Redundant Array of Independent Disks (RAID)—A high-volume storage device having multiple storage drives and fault recovery procedures.

Server Message Block (SMB)—a message format used by to share files, directories and devices.

Transmission Control Protocol (TCP)—a higher-level network communication protocol that establishes a virtual connection between a destination and a source.

Transmission Control Protocol/Internet Protocol(TCP/IP)—the suite of network communications protocols including both TCP and IP.

Web Distributed Authoring and Versioning (WebDAV) is a set of extensions to the Hypertext Transfer Protocol (HTTP) that seeks to make the World Wide Web a collaborative, writeable medium.

World Wide Web (WWW—A system of Internet servers that support documents specially formatted in the HTML language that supports links to other documents, as well as graphics, audio, and video files.

An Exemplary Operating Environment

Figure 1:
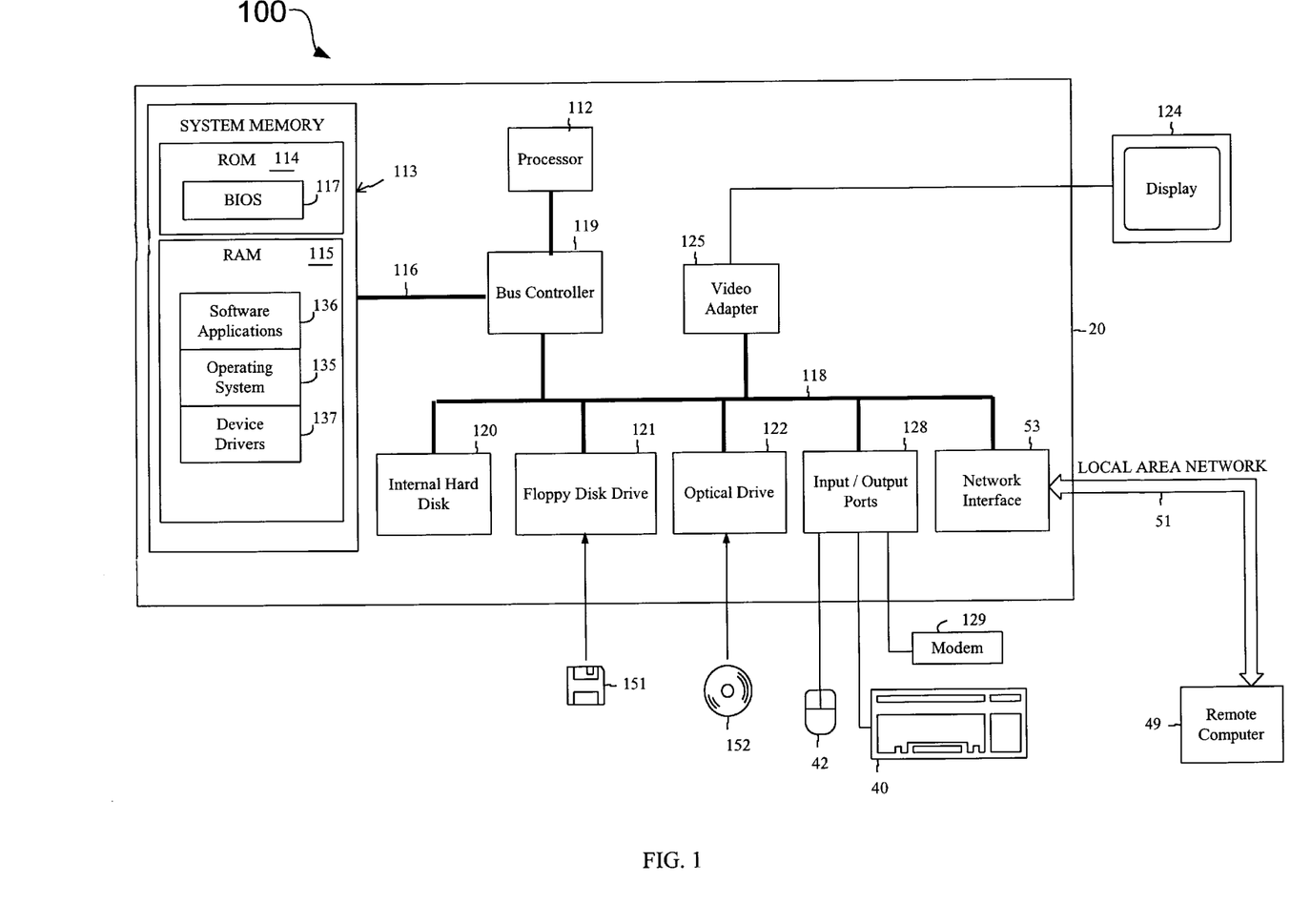
FIG. 1 is a diagram showing an exemplary hardware and operating environment of a suitable computer for use with embodiments of the invention.

FIG. 1 illustrates a computer 100 suitable for supporting the operation of an embodiment of the present invention. As shown in FIG. 1, the computer 100 includes a processor 112 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computer 100 represents any server, personal computer, laptop or even a battery-powered, pocket-sized, mobile computer known as a hand-held PC or personal digital assistant (PDA).

Computer 100 includes system memory 113 (including read only memory (ROM) 114 and random access memory (RAM) 115), which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computer 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

A user enters commands and information into the computer 100 by using a keyboard 40 and/or pointing device, such as a mouse 42, which are connected to bus 118 via input/output ports 128. Other types of pointing devices (not shown in FIG. 1) include track pads, track balls, joy sticks, data gloves, head trackers, and other devices suitable for positioning a cursor on the video display 124.

As shown in FIG. 1, the computer 100 also includes a modem 129. Although illustrated in FIG. 1 as external to the computer 100, those of ordinary skill in the art will quickly recognize that the modem 129 may also be internal to the computer 100. The modem 129 is typically used to communicate over wide area networks (not shown), such as the global Internet. Modem 129 may be connected to a network using either a wired or wireless connection.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once software application 136 is loaded into the RAM 115, it can be used by the processor 112. In case of large software applications 136, processor 112 loads various portions of program modules into RAM 115 as needed.

The Basic Input/Output System (BIOS) 117 for the computer 100 is stored in ROM 114 and is loaded into RAM 115 upon booting. Those skilled in the art will recognize that the BIOS 117 is a set of basic executable routines that have conventionally helped to transfer information between the computing resources within the computer 100. Operating system 135 or other software applications 136 use these low-level service routines.

In one embodiment computer 100 includes a registry (not shown) which is a system database that holds configuration information for computer 100. For example, Windows® 95 and Windows® NT by Microsoft maintain the registry in two hidden files, called USER.DAT and SYSTEM.DAT, located on a permanent storage device such as an internal disk.

Methods and Systems of the Invention

Figure 2:
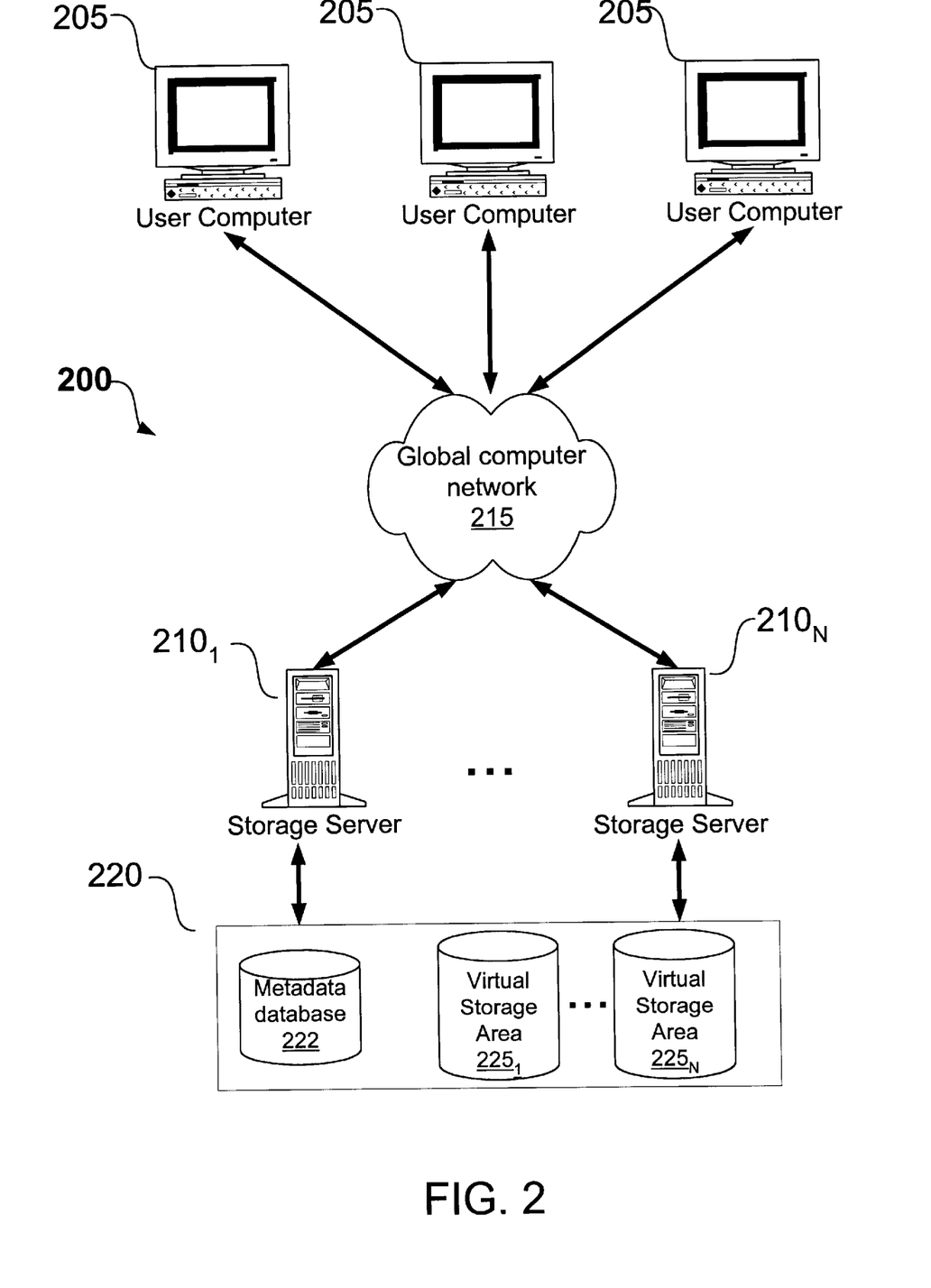
FIG. 2 illustrates one embodiment of a computing system in which a storage server provides seamless access to remote storage areas.

FIG. 2 is a block diagram illustrating one embodiment of a computing environment 200 that provides seamless access to remote storage areas. In the illustrated embodiment, client computers 205 are communicatively coupled to remote storage network 220 via storage servers 210 and global computer network 215 such as the Internet. Storage network 220 represents one or more interconnected storage devices, such as a RAID, for storing data files. The storage network 220 defines a pool of virtual storage areas 225 that can be individually assignable to different users. Initially, a user accesses storage servers 210 via global computer network and requests a virtual storage area 225. For each request, storage server 210 prompts the user for information such as a username, password, billing address, etc. Upon approval, storage network 220 allocates a storage area 225 to the user such that, as described in detail below, the user can seamlessly access the corresponding virtual storage area via client computers 205. Metadata database 222 stores metadata associated with the data files by the user. Storage server 210 and client computers 205 represent computing devices such as computer 100 described in FIG. 1.

According to various embodiments of the invention, a set of communication software applications execute on storage servers 210 and provide a set of interfaces such that client computers 205 can access virtual storage areas 225 using any one of several different methods. Each method offers different advantages in control, performance and ease of use. For example, in one embodiment, access to the virtual storage areas 225 is fully integrated with operating system 135 executing on each client computer 205. In this embodiment, the user can directly access a virtual storage area 225 via the operating system's user interface. Software applications 136 executing on client computer 205 can access the corresponding virtual storage area 225 through operating system 135 by calling standard file management routines provided by operating system 135. In this embodiment, operating system 135 packetizes data files and metadata received from the management routines and communicates the data to storage servers 210 via network 215. In this embodiment, operating system 135 handles all communication with storage servers 210 such that virtual storage area 225 can be accessed as if it were local to client computer 205.

In another embodiment, the user can access virtual storage area 225 by invoking a communications application 136 such as a web browser or an FTP utility. In this embodiment, the communications application 136 handles communication across network 215. The underlying communications between client computers 205 and storage servers 210 can follow a variety of protocols. Typically, the communications use TCP/IP as a base protocol and additionally use the HTTP protocol, the FTP protocol or even a proprietary data-backup protocol.

The following sub-sections describe the various techniques by which, according to the invention, client computers 205 access virtual storage areas 225 via storage servers 210 and global computer network 215.

Access via the Operating System

According to the invention, in one embodiment, the user can access virtual storage area 225 via operating system 135 in the same manner by which the user accesses local storage devices 120, 121 and 122. In this embodiment, the user interacts with the user interface presented by operating system 135 and manages virtual storage area 225 as if it were a local storage volume. For example, by interacting with operating system 135 the user can perform all common file management tasks including coping files between hard disk 120 and remote storage area 225, as well as renaming and deleting data files. The user is able to browse directory structures within virtual storage area 225 as if it were a local storage volume. Indeed, in some embodiments, virtual storage area 225 may be represented as an icon on the desktop of the user's computer.

Figure 3:
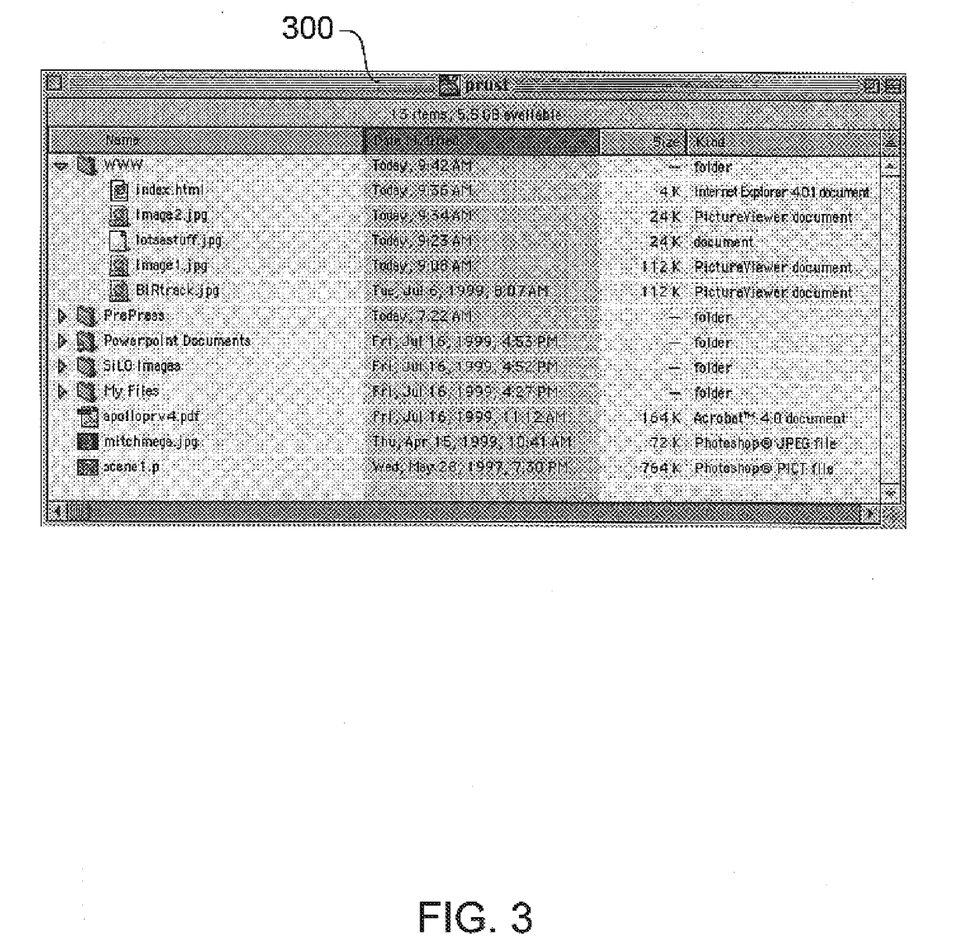
FIG. 3 illustrates a user interface displayed by one embodiment of an operating system for directly accessing a remote storage area using standard file management routines provided by the operating system.

FIG. 3 illustrates window 300 as displayed by operating system 135 for accessing a virtual storage area 225. In the illustrated embodiment, operating system 135 is the Macintosh® operating system from Apple Computer, Inc. Window 300 presented by operating system 135 lists the directories and files of virtual storage area 225 as if the directories and files were local. The user is able to browse the directories within virtual storage area 225 and perform the file management operations supported by operating system 135 such as copying, renaming, moving and deleting files and directories. Similarly, applications 136 executing on client computer 205 access virtual storage area 225 through standard file management routines provided by an application programming interface (API) of operating system 135. In one embodiment, operating system 135 of client computers 205 is the Macintosh operating system, such that the API includes the Apple File Services (AFS), and storage servers 225 are support accessing remote data files within storage area virtual 225 via the Apple Filing Protocol (AFP) services over TCP/IP.

Figure 4:
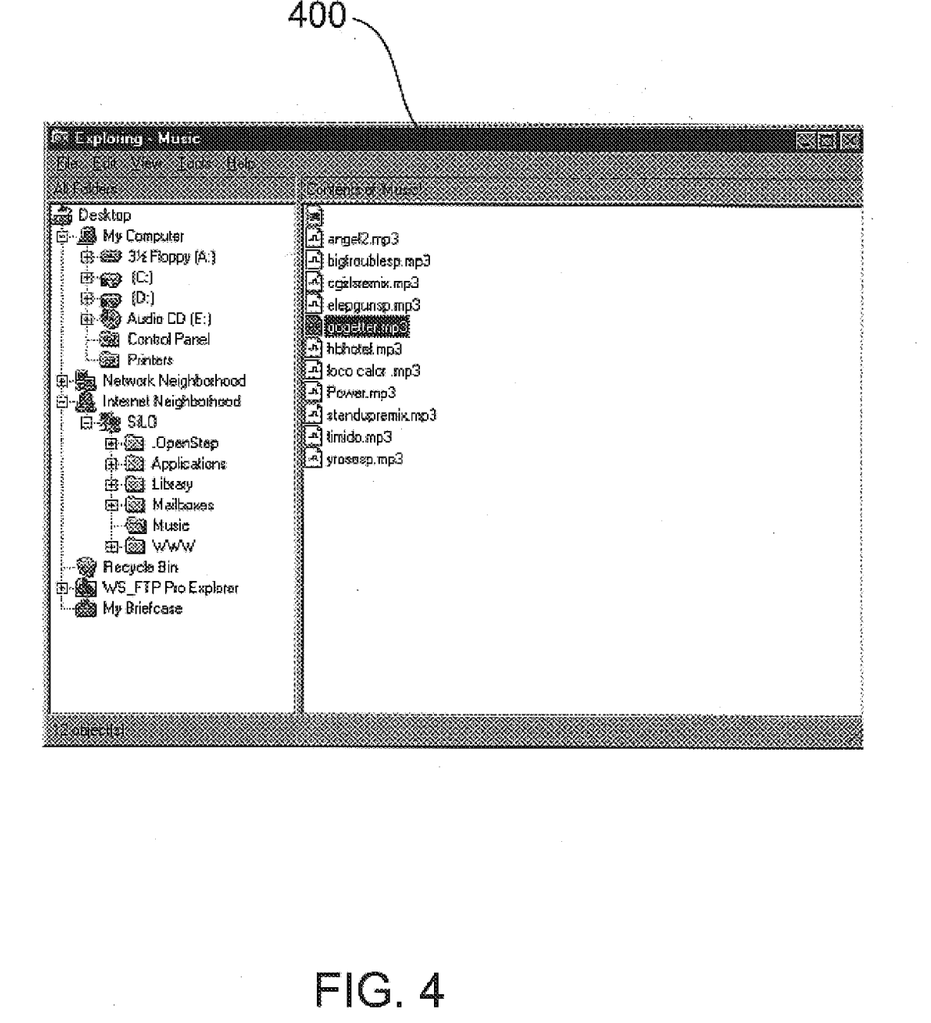
FIG. 4 illustrates a user interface displayed by another embodiment of an operating system for directly accessing a remote storage area.

FIG. 4 illustrates another embodiment in which operating system 135 is the Windows® operating system from Microsoft. Here, operating system 135 displays window 400 that presents an integrated list of those files and directories that are available locally as well as those available from virtual storage area 225. In this embodiment, operating system 135 incorporates the SMB protocol or the WebDAV protocol in order to provide seamless access to virtual storage area 225.

Figure 5:
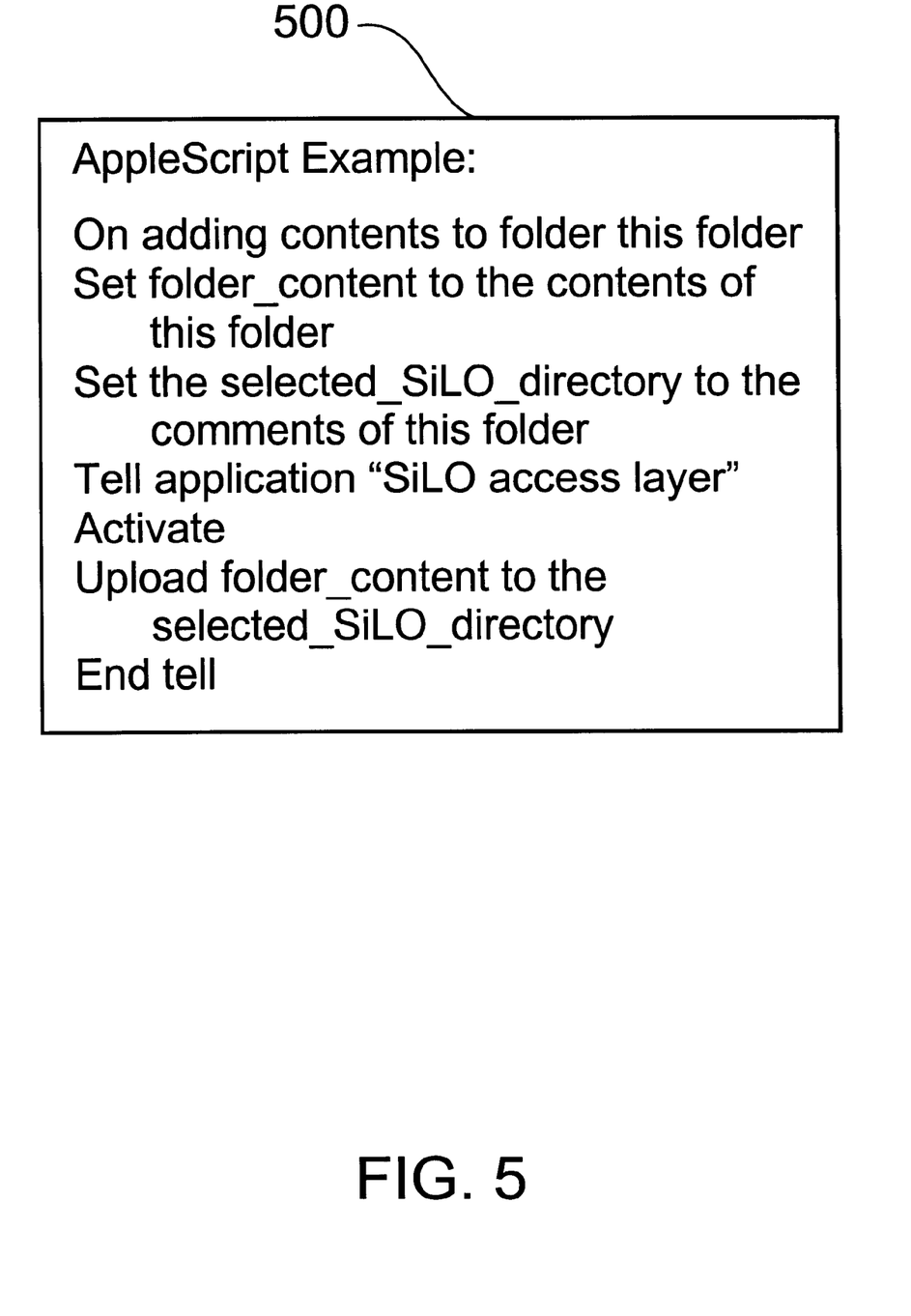
FIG. 5 illustrates an example operating system script written in AppleScript for the Macintosh® operating system that automatically copies a file from a local directory to a similarly named remote directory located within a storage area.

One particular advantage of this embodiment is that software applications 136 executing on computer 100 can access virtual storage area 225 without modification. Because operating system 135 provides seamless access to virtual storage area 225 via conventional file management routines, software applications 136 treat virtual storage area 225 as if it were a local storage volume. Another advantage is that the user can write scripts for operating system 135, such as an OSAX AppleScript for the Macintosh® operating system, in order to control access to virtual storage area 225. FIG. 5 illustrates an operating system script 500 written in AppleScript that automatically copies a file from a local directory to a similarly named remote directory located within virtual storage area 225.

According to one aspect of the invention, the user can associate metadata with each data file as the data file is uploaded to remote storage areas 225 in order to facilitate the quick cataloging and quick retrieval of the data file. Operating system 135 captures the metadata from the user via an input form and communicates the metadata to storage servers 210.

Direct Access From a Communication Software Application

In some embodiments, the user can invoke conventional communication applications and utilities such as a web browser, an FTP utility, a data storage backup utility, or even a conventional email software application, to access virtual storage area. During this method of access, the communication software application 136 handles all communications with storage servers 210. The file management routines of operating system 135 are not invoked. In addition, the communication software 136 is responsible for capturing the metadata from the user and communicating the metadata to storage servers 210 for storage within metadata database 222.

Figure 6:
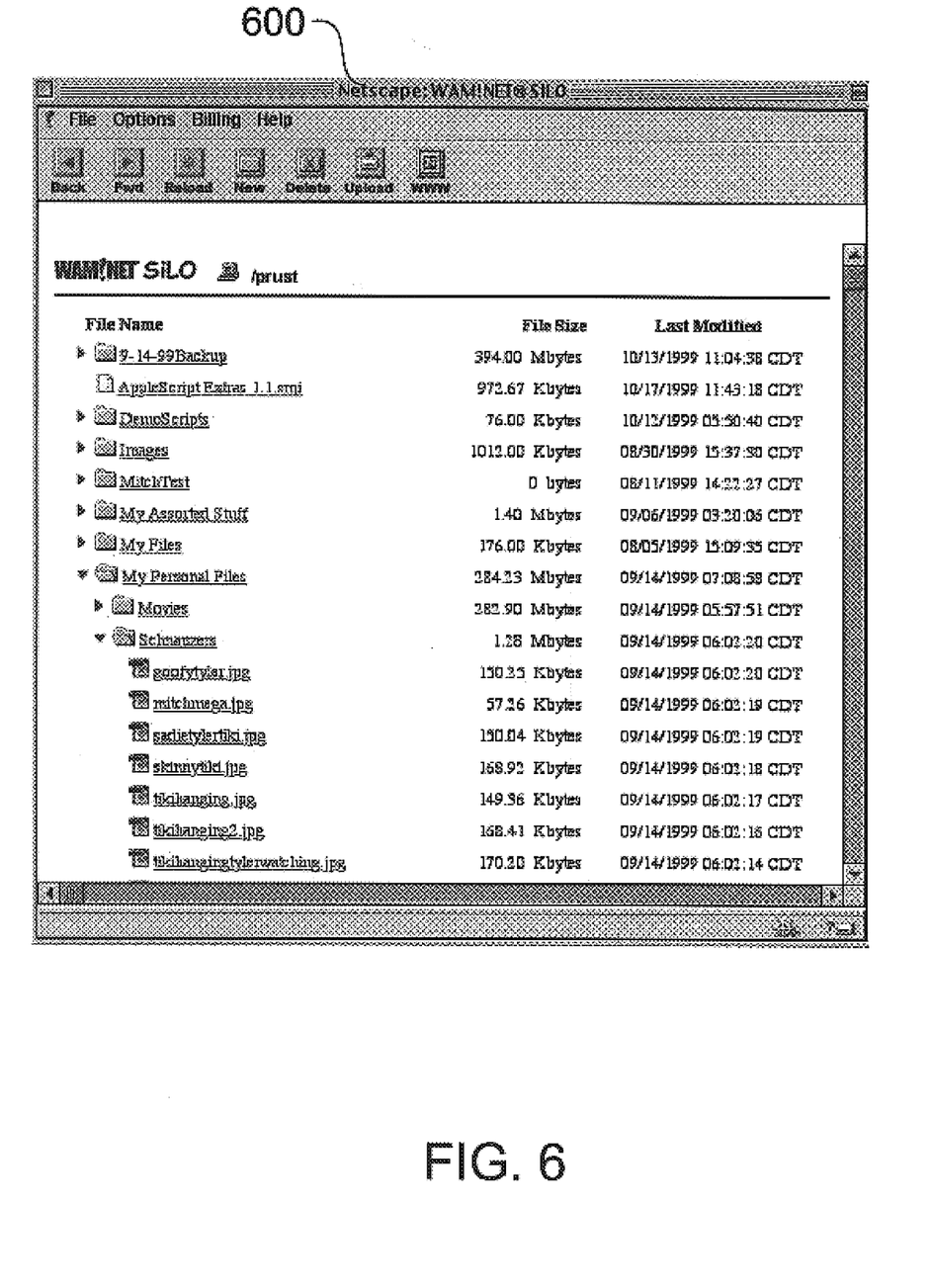
FIG. 6 illustrates a window displayed by a conventional web browser when a user accesses a virtual storage area.

FIG. 6 illustrates the user accessing one of the virtual storage areas 225 via a conventional web browser executing on client computer 205. The web browser displays window 600 that lists each directory within virtual storage area 225. Storage servers 210 maintain a set of image icons for representing the stored data file according to file and creator type information or file extension. Storage servers 210 select and display an appropriate icon as a function of the file and creator information stored within virtual storage area 225.

Window 600, therefore, closely resembles windows 300 and 400 as displayed by operating system 135. Using the browser, the user can browse the directories within virtual storage area 225 and can perform many common file management operations including uploading, downloading and deleting files, as well as creating and removing directories.

Figure 7:
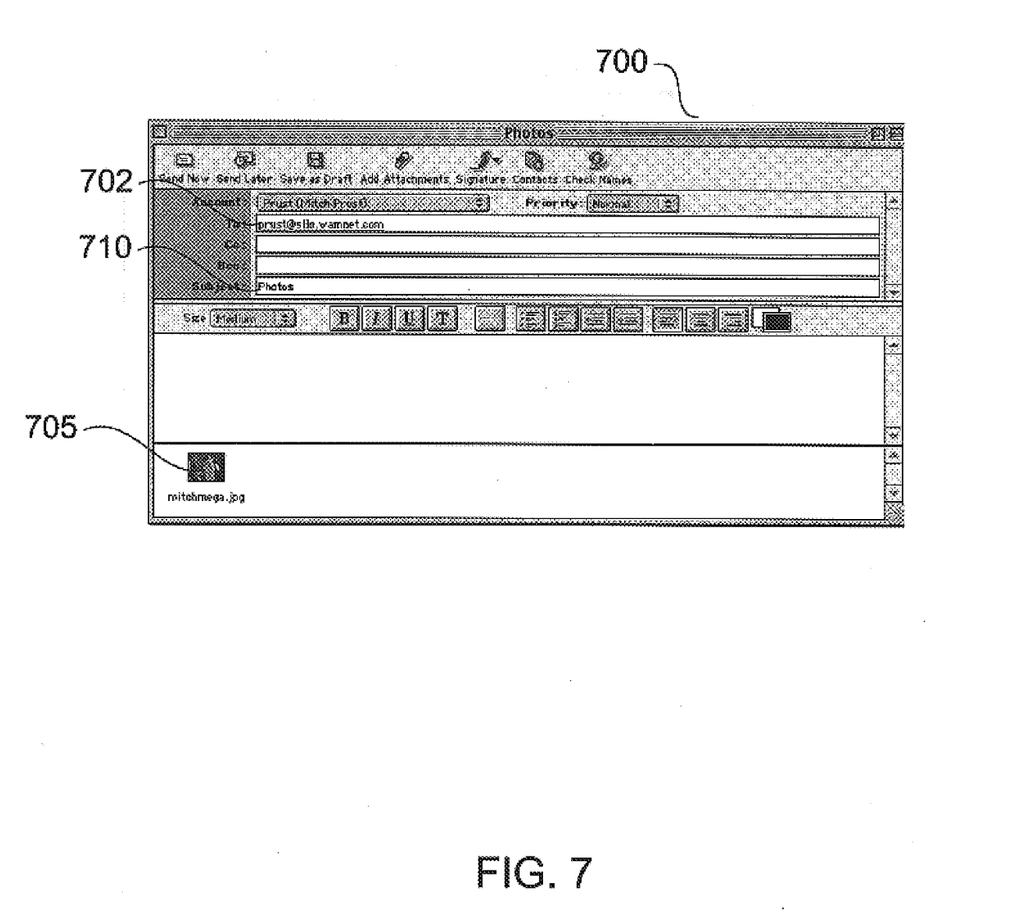
FIG. 7 illustrates a window displayed by a conventional electronic mail software application when a user mails one or more data files to a corresponding storage area.

FIG. 7 illustrates the user accessing virtual storage area 225 using a conventional electronic mail software application 136. Electronic mail software application 136 displays window 700 by which the user creates an email message having user information 702 and target data file information 710. The user addresses the email to his or her email address at storage servers 210. For uploading files, as displayed in window 700, the user attaches one or more data files 705. Upon receiving the email, storage server 210 parses the user information 702 and the target data file information 710 in order to extract one or more target directories. Thus, user information 702 may take the form of a destination electronic mail address, while target data file information 710 may take the form of text in the subject field of an electronic mail message. Storage server 210 stores attached files 705 to the target directory within the appropriate virtual storage area 225 assigned to the user. In this manner, the user is able to email one or more files directly into a specified directory within virtual storage area 225 from any remote location via network 215. In an alternative embodiment, the user does not attach a data file but includes within the electronic mail message a universal resource locator (URL) that indicates where storage server 210 can retrieve the data file to be stored. In order to retrieve one or more data files from storage server 210, the user sends a similar email requesting one or more target data files. In response, storage server 210 sends the user a response electronic mail message with the requested data files attached.

Remote Processing via Centrally Hosted Applications

The above sections described how, according to the invention, client computers 205 access virtual storage area 225 for remote data storage. The invention, however, is not limited to data storage. According to one aspect of the invention, client computers 205 communicate data files to storage servers 210 for remote processing by one or more applications executing on storage servers 210. For example, the communicated data files may be electronic images such that applications executing on storage servers 210 perform color correction, color proofing and other prepress operations. Other examples include data conversion, compression, decompression, encryption and decryption. As such, a user is able to submit data files for remote processing by simply instructing operating system 135 to copy the data files to a designated directory within virtual storage area 225. As such, this operation can be performed by simply dragging and dropping the file onto the appropriate window presented by operating system 135.

Allocation of a Remote Storage Area

Figure 8:
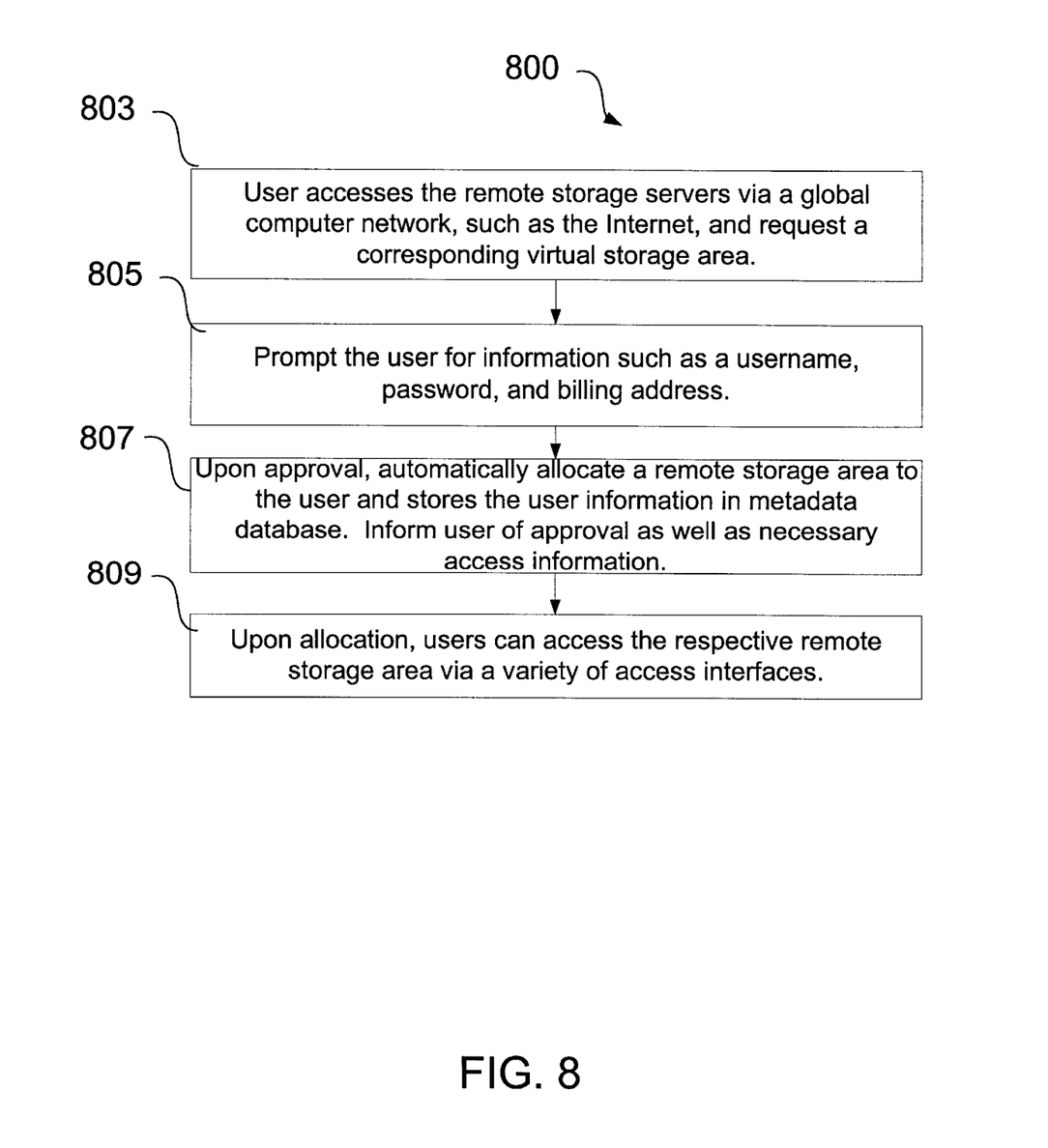
FIG. 8 is a flow chart that provides a high-level overview of how the storage system allocates remote storage areas.

FIG. 8 is a flow chart 800 that provides a high-level overview of one mode of operation in which storage network 220 allocates remote storage areas 225. In block 803, users access storage servers 210 via global computer network 215 and request a corresponding virtual storage area 225. For each request, storage server 210 prompts the user for information such as a username, password, billing address (block 805). Upon approval, storage network 220 automatically allocates a corresponding storage area 225 for each user and stores the respective user information in metadata database 222 (block 807). After a virtual storage area 25 has been allocated, storage network 220 informs each user of any necessary access information, such as a password, so that the user can access the respective storage area 225 via the many access interfaces described above (block 809).

Various embodiments have been described of a method and system for a data storage system that provides seamless access to remote virtual data storage areas via a global computer network. Access to the virtual storage area is fully integrated with the operating system executing on the client computer such that the user, or software applications executing on the computer, can seamlessly access the corresponding virtual storage area using standard file management routines provided by the operating system. In addition, the invention provides a wide range of other remote access methods to the virtual data storage areas including access via electronic mail. This application is intended to cover any adaptation or variation of the present invention. It is intended that this invention be limited only by the claims and equivalents thereof.

What is claimed is:

1. A data storage system comprising:
    a client computer;
    a storage server communicatively coupled to the client computer via a global computer network, wherein the storage server allocates a user-assignable remote storage area in response to a request received from the client computer over the global computer network;
    a plurality of software applications executing on the storage server to provide a plurality of different access interfaces for accessing the remote storage area;
    an operating system executing on the client computer and including application programming interface (API) routines that communicate with a first one of the access interfaces of the storage server to manage data files within the remote storage area as if the data files were local on the client computer; and
    a communication software application executing on the client computer to directly communicate with a second one of the access interfaces of the storage server to manage the data files within the remote storage area without invoking the API routines of the operating system executing on the client computer.

2. The data storage system of claim 1, and wherein the operating system encrypts one or more data files and communicates the data files to the storage server for storage within the storage area.

3. The data storage system of claim 1, and wherein the operating system issues requests to the storage server to retrieve one or more data files from the storage area.

4. The data storage system of claim 1, and wherein the API routines include at least a file management routine to facilitate copying, deleting, moving and renaming data files.

5. The data storage system of claim 1, and wherein the API routines include a routine to facilitate creating, deleting and renaming data file directories.

6. The data storage system of claim 1, wherein the storage server and the computer communicate via the Transmission Control Protocol/Internet Protocol (TCP/IP).

7. The data storage system of claim 1, wherein the API includes Apple File Services and the first one of the access interfaces of the storage server supports Apple Filing Protocol for accessing the data files within the remote storage area.

8. The data storage system of claim 1, wherein the communication software application comprises one of a web browser, a File Transfer Protocol (FTP) utility, a data storage backup utility, and an electronic mail software application.

9. The data storage system of claim 1, wherein the API supports Web Distributed Authoring and Versioning (WebDAV) and the first one of the access interfaces presented by the software applications executing on storage server supports WebDAV for accessing the data files within the remote storage area as if the data files were local.

10. The data storage system of claim 1, wherein the API supports Server Message Block (SMB) protocol and the first one of the access interfaces presented by the software applications executing on the storage server supports SMB for accessing the remote storage area.

11. The data storage system of claim 1, wherein the software applications executing on the storage server include an electronic mail application to receive an electronic mail message from the client computer that contains at least one attached data file, wherein the electronic mail application analyzes the electronic mail message to identify a target one of the remote storage areas, and store the attached data file within the identified target remote storage area.

12. The data storage system of claim 11, wherein the electronic mail message flu includes text and the electronic mail application parses the text to determine the target remote storage area.

13. The data storage system of claim 11, wherein the electronic mail application analyzes content of a subject field associated with the electronic mail message to determine the target remote storage area.

14. The data storage system of claim 11, wherein the electronic mail application both content of a subject field associated the electronic mail message and content of a destination address associated with the electronic mail message to determine the target remote storage area.

15. A method for accessing data files from a computer having an operating system executing thereon, the method comprising:

allocating one of a set of remote storage areas provided by a storage server to a user in response to a request received via a global computer network, wherein the storage server provides an operating environment for a plurality of software applications to present a plurality of different access interfaces for accessing the set of remote storage areas;

receiving a file access request via one of: (1) an application programming interface (API) routine provided by an operating system of a client computer that communicates with a first one of the access interfaces presented by the software applications of the storage server to manage remote data files within the remote storage areas as if the data files were local on the client computer, and (2) a communication software application executing on the client computer that communicates with a second one of the access interfaces of the storage server to manage the data files within the remote storage area;

communicating the access request to the storage server via the global computer network and the respective one of the different access interfaces presented by the software applications of the storage server; and accessing the data files with the remote storage server according to the request.

16. The method of claim 15, wherein communicating the access request to the storage server includes encrypting one or more data files and sending the data files to the storage server for storage within the storage area.

17. The method of claim 15, wherein communicating the access request to the storage server includes issuing requests to the storage server to retrieve the remote data file from the storage area.

18. The method of claim 15, wherein communicating the access request to the storage server includes communicating user information to the remote storage server.

19. The method of claim 18, wherein accessing the remote data file includes authenticating the user information.

20. The method of claim 19, wherein authenticating the user information includes comparing the user information to a username and password, stored on the remote storage server.

21. The method of claim 15, wherein communicating the access request includes communicating via Transmission Control Protocol/Internet Protocol(TCP/IP).

22. The method of claim 15, wherein receiving a file request via the API routine includes receiving a file request via Apple File Services.

23. The method of claim 15, wherein accessing the remote data file includes executing a software application to invoke the API as if the remote data file where local.

24. The method of claim 23, wherein executing the software application includes executing the software application to browse for a data file.

25. The method of claim 15, wherein the communication software application comprises one of a web browser, a File Transfer Protocol (FTP) utility, a data storage backup utility, and an electronic mail software application.

* * * * *